Nov. 4, 1952               E. T. DAVIS               2,617,089
ELECTRICAL CONTROL SYSTEM
Filed Jan. 19, 1949                                        8 Sheets-Sheet 2
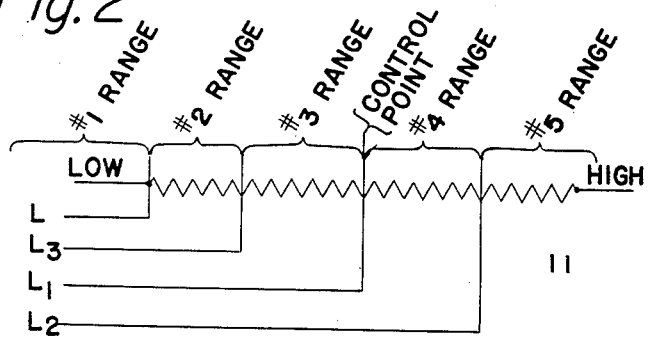
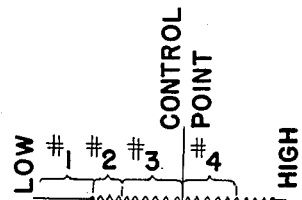
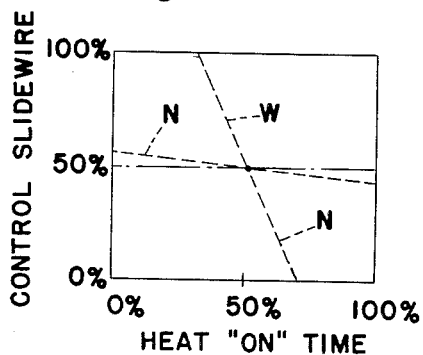
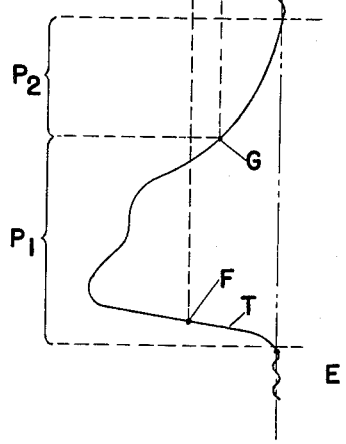
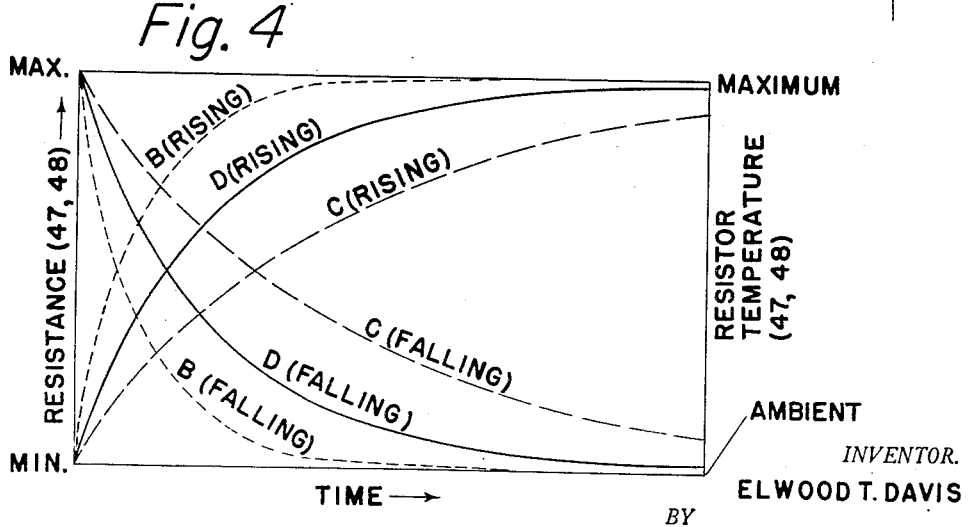
INVENTOR.
ELWOOD T. DAVIS
BY
Woodcock and Phelan
ATTORNEYS Nov. 4, 1952 — E. T. DAVIS — 2,617,089
ELECTRICAL CONTROL SYSTEM
Filed Jan. 19, 1949 — 8 Sheets-Sheet 3

INVENTOR
ELWOOD T. DAVIS
BY
*Woodock and Phelan*
ATTORNEYS

Nov. 4, 1952     E. T. DAVIS     2,617,089
ELECTRICAL CONTROL SYSTEM
Filed Jan. 19, 1949     8 Sheets-Sheet 4

INVENTOR
ELWOOD T. DAVIS
BY
Woodcock and Phelan
ATTORNEYS

Nov. 4, 1952    E. T. DAVIS    2,617,089
ELECTRICAL CONTROL SYSTEM
Filed Jan. 19, 1949    8 Sheets-Sheet 5

INVENTOR.
ELWOOD T. DAVIS
BY
*Woodcock and Phelan*
ATTORNEYS

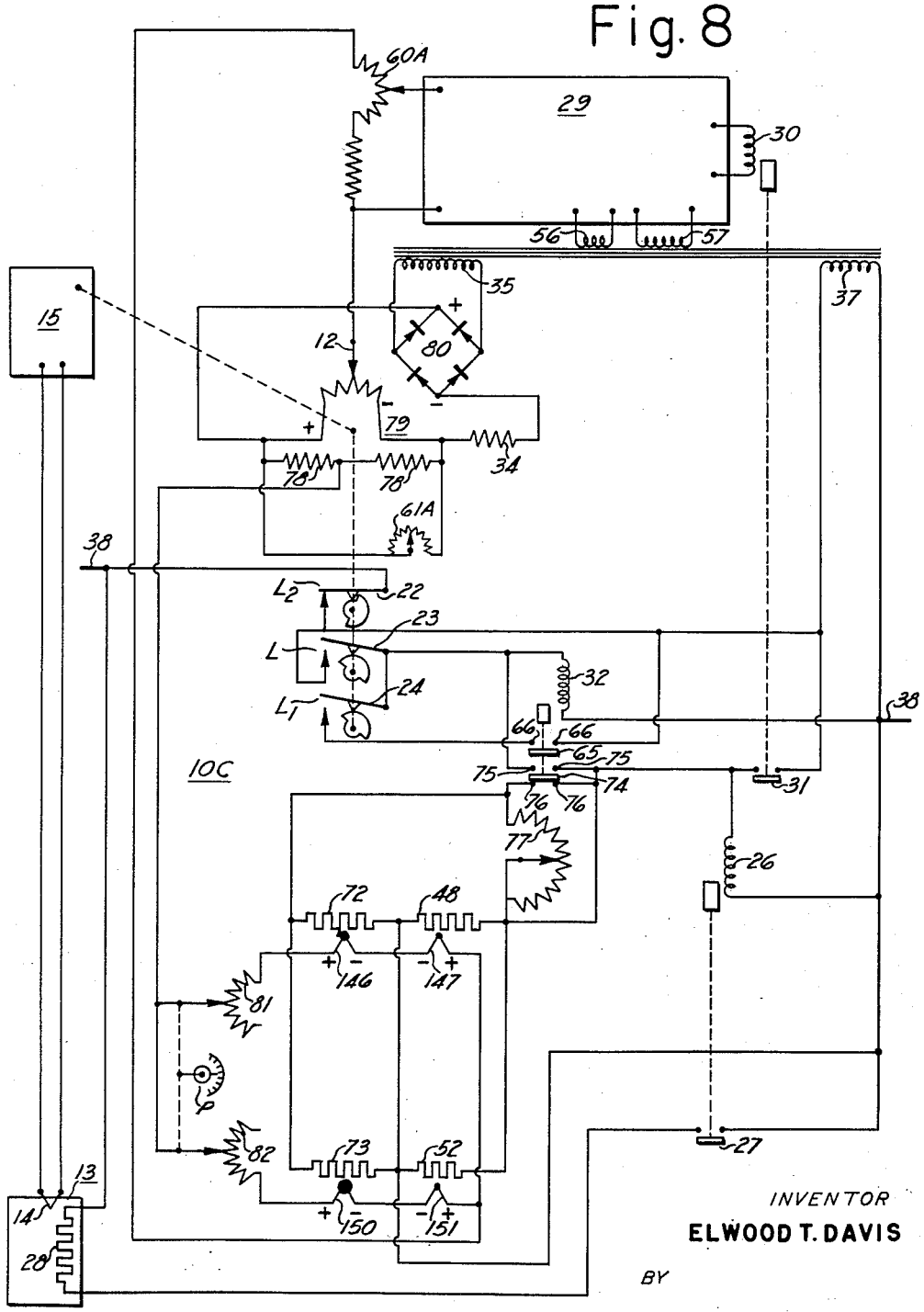

Patented Nov. 4, 1952

2,617,089

UNITED STATES PATENT OFFICE 2,617,089

ELECTRICAL CONTROL SYSTEM

Elwood T. Davis, Brookline, Pa., assignor to Leeds and Northrup Company, Philadelphia, Pa., a corporation of Pennsylvania Application January 19, 1949, Serial No. 71,644

13 Claims. (Cl. 323—69)

This invention relates to electrical systems for controlling a process variable such as temperature, pressure or other physical, chemical or other electrical condition, and particularly relates to control systems utilizing a balanceable network which, under control of a detector, regulates application of an agent affecting the process variable.

In accordance with one aspect of the invention, there is provision for selection, within a wide range, of any desired second-derivative "rate" control action of the system or of any desired droop-corrective action. More specifically, the potentials of two points of the control network are caused cyclically to increase and decrease at different rates predetermined by the substantially different thermal inertias of temperature-responsive devices heated and cooled under control of the detector: by choice of the circuit location of said devices, the range of variation of the potential difference between said points may correspond either to the range of "droop-corrective" action or to the range of "rate" control action and consequently the selection of different "rate" control actions or of different droop corrective actions may be effected by adjustment of a potential-dividing impedance connected between said points of the network. More specifically, in preferred forms of the invention, both the rate control action and the droop-corrective action may be individually and independently varied without disturbance of the other.

More particularly, in some forms of the invention, the temperature-responsive devices are resistors having appreciable temperature coefficients of resistance, whereas in other forms they are thermocouples or equivalent voltage-generating devices: moreover, in some modifications, the resistors or thermocouples are heated by auxiliary resistors respectively associated therewith and energized under control of the detector, whereas in other modifications these cycling elements are directly heated by passage through them of current varied by the detector.

In accordance with another aspect of the invention, it is provided that upon large deviation of the process variable from a desired control point, the throttling-range of the control system shall be substantially widened for rapid return, without overshooting, of the process variable toward the control point and that the throttling range shall be substantially narrowed as the control point is closely approached or attained for close regulation of the process variable when near the control point. More specifically, a control slidewire adjusted in accordance with changes of the process variable is selectively shunted by throttling-range resistors of different magnitudes under control of relay means energized and deenergized in accordance with the existing position of the control slidewire and the prior history of its adjustment.

This application is a continuation-in-part of my copending application, Serial No. 22,287, filed April 21, 1948, now abandoned.

The invention further resides in the systems, combinations and arrangements hereinafter described and claimed.

Fig. 1 schematically illustrates a control system embodying the invention;

Fig. 2 is an explanatory figure correlating different control ranges to the control slidewire of Fig. 1;

Fig. 3 is an explanatory figure referred to in discussion of throttling-range selection;

Fig. 4 is an explanatory figure referred to in discussion of selection of different rate control actions;

Fig. 5 is an explanatory figure referred to in discussion of operation of the system of Fig. 1;

Figure 1:
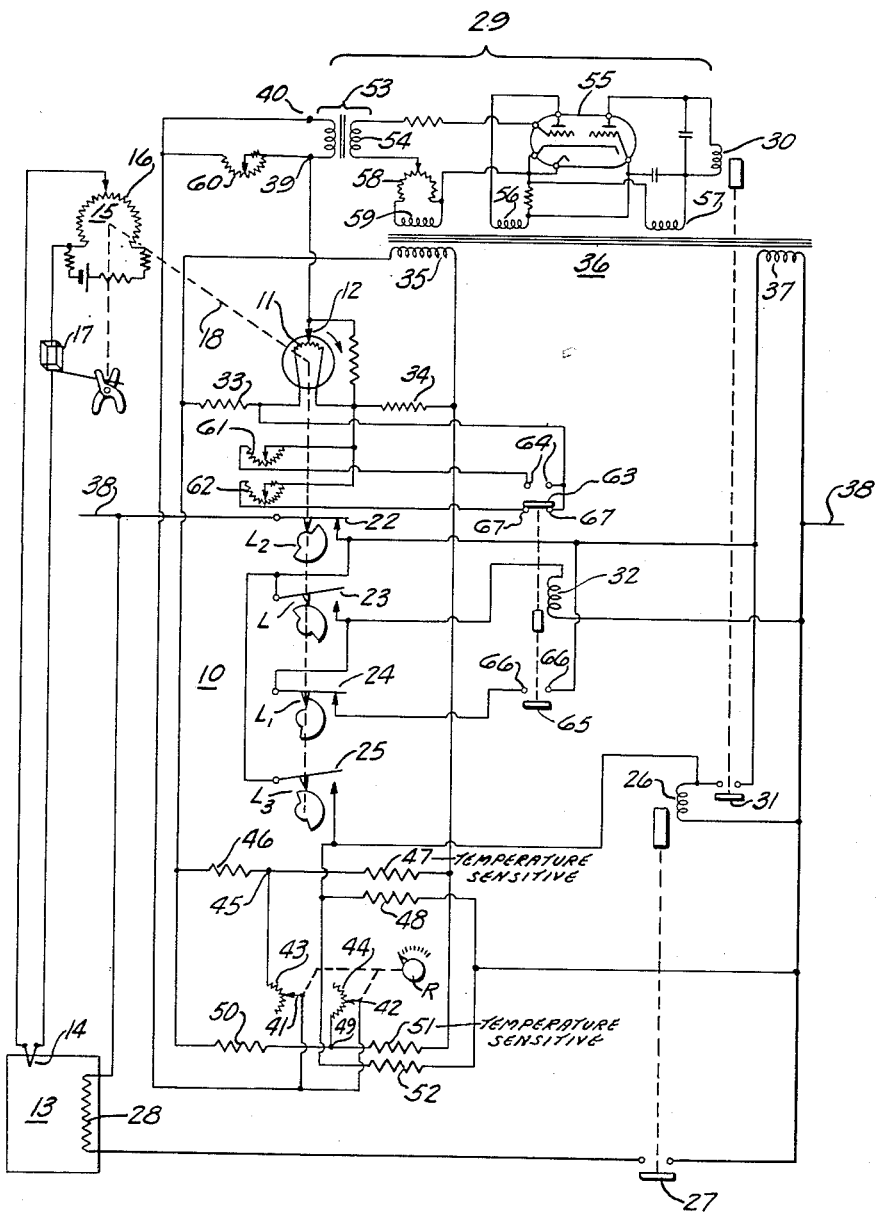

Referring to Fig. 1, the control network 10 includes a slidewire 11 which is adjusted with respect to a movable contact 12 so that its displacement from a predetermined setting corresponding with the control point is directly related to the deviation of a process variable, such as pressure, temperature or the like, from the desired magnitude thereof. In the particular arrangement shown for purpose of explanation, the adjustment of the slidewire impedance 11 is effected in response to changes of temperature of furnace 13 as measured by a thermocouple 14, or its equivalent. The thermocouple 14 may be included in a self-rebalancing potentiometer network 15 comprising a slidewire 16 automatically adjusted, as under control of a galvanometer 17, to effect and maintain balance of the measuring network 15 at the existing furnace temperature. The self-rebalancing may be effected by mechanism of the type shown in Squibb Patent No. 1,935,732, or the rebalancing may be effected by an electromechanical system such as shown in Williams Patent No. 2,113,164. In any event, the slidewires 16 and 11 are coupled so that for each position of the measuring slidewire 16 corresponding with a particular temperature of the furnace, there is a corresponding position of the control slidewire 11. Initially, the position of normally fixed contact 12 is so adjusted with respect to slidewire 11 that when the furnace is at the desired temperature of predetermined magnitude, the contact 12 is substantially midway of the slidewire 11, which position, for brevity, is termed the "control point."

To the shaft 18 of the control slidewire 11 is attached a series of cams for respectively actuating the movable contacts 22, 23, 24 and 25 of control switches L2, L, L1 and L3 respectively. With the cams in the position shown in Fig. 1, the tempertaure is immediately below the control point: accordingly, as appears from Fig. 2 and from Table A below, the switches L1 and L2 are closed and the switches L and L3 are open. The circuit-controlling positions of these switches for the different ranges of the control slidewire above and below the control point are shown in Table A below.

arms of a bridge network. The resistance of resistor 46 remains constant in operation of the network whereas the resistance of temperature-responsive resistor 47, with which is associated a heater 48, varies. The heater 48 for resistor 47 is energized concurrently with energization of the relay 26 under control of switch L3 or of relay 30 so that when the heater 28 of the furnace 13 is effective to supply heat to the furnace, the heater 48 is concurrently supplying heat to resistor 47 to raise its temperature. Assuming heat is continuously supplied to the furnace, the heater 48 is therefore continuously supplying heat to resistor 47 and the temperature of the unit comprising resistor 47 and heater 48 rises toward its ultimate or maximum temperature at which the heat losses are equal to the heat input of the unit. In Fig. 1 and in subsequently described figures, the temperature-sensitive resistors are identified

*Table A—Fig. 1*

| Range | L | L3 | L1 | L2 | Relay 32 | Relay 30 | Aux. relay 26 |
| --- | --- | --- | --- | --- | --- | --- | --- |
| #1 | Closed | Closed | Closed | Closed | In (rising)<br>In (falling #2–#1) | Not effective | In. |
| #2 | Open | do | do | do | In (rising #1–#2)<br>Out (falling #4–#2) | do | In. |
| #3 | do | Open | do | do | In (rising #1–#3)<br>Out (falling #4–#3) | On-Off detector controlled | On-Off relay 30 controlled. |
| #4 | do | do | Open | do | Out | do | Do. |
| #5 | do | do | do | Open | Out | Out | Out. |

For the low ranges #1 and #2, the switch L3 maintains continued energization of a relay or contactor 26 used to control the heat input to the furnace 13. Specifically, the movable contact structure 27 of relay 26 opens and closes the circuit of the furnace heater 28, but it shall be understood the opening of contact 27 may be used to reduce the heating current, the agent affecting the process variable, to low value other than zero. In either case, there is effected an "on-off" or "maximum-minimum" control of the heat input. For ranges #3 and #4, for which switch L3 is open, the relay 26 is under control of the detector 29 which as later described responds to unbalance of the control network 10. Specifically, for ranges #3 and #4, relay 26 is energized and deenergized in accordance with the position of contact 31 of relay 30, or equivalent, connected to the output terminals of detector 29. The cam-operated switches L and L1 control a relay 32 to change the width of the "throttling-range" in dependence upon the position and the prior history of the control action. The switch L2 is a safety switch which breaks all circuits to the contactor 26, thus preventing its energization for all temperatures of range #5.

The control slidewire 11 and the resistors 33 and 34 form two arms of a bridge circuit supplied with current from the winding 35 of a transformer 36 whose primary 37 is connected to the power line conductors 38, 38 so long as switch L2 is closed, i. e., for ranges #1 through #4. The slidewire contact 12 is connected to the input terminal 39 of the detector 29 so that the potential of terminal 39 varies in correspondence with the furnace temperature.

The other input terminal 40 of the detector 29 is connected to the adjustable contacts 41, 42 of resistors 43 and 44 which as later appears, are simultaneously manually adjustable to predetermine the "rate" or second-derivative action of the control system. The upper terminal of the resistor 43 is connected to point 45 of network 10 between the resistors 46 and 47 which form two by the legend (Temperature Sensitive) or its abbreviation (TS).

The rate at which the temperature and resistance of resistor 47 increases depends upon the thermal inertia of the heater-resistor unit. When the heater and resistor coils are wound on a thin-walled metal form, the resistance increases fairly rapidly as generally shown by the rising portion of curve B, Fig. 4, so that the temperature of resistor 47 will rise from ambient to $1/e$ of maximum in a short time, for example, about one-half minute. For a given unit, the temperature $T_H$ at a particular time in the heating period is determinable from the formula (1) $$T_H = T_M(1 - e^{-Bt})$$

where $T_H$ = instantaneous temperature (in degrees above ambient)
$T_M$ = maximum temperature (in degrees above ambient)
$B$ = thermal constant of the unit
$t$ = heating time from ambient
$e$ = Naperian base The balance point of the bridge formed by the resistors 33, 11, 34, 46 and 47 therefore under the conditions assumed continuously changes in accordance with a fixed law during continued application of heat to the furnace. The temperature-sensitive resistor 47 is located in that arm of the bridge which insures that the balance point will shift toward or beyond the "low" end of the slidewire as resistor 47 increases in temperature.

When the heater 48 is deenergized, the unit 41, 48 cools and the resistance of resistor 47 decreases along the falling portion of curve B to shift the balance point of the bridge 33, 11, 34, 46 and 47 toward the "high" end of the slidewire. The law of decrease of the resistor temperature ($T_c$) during cooling is (2) $$T_c = T_M e^{-Bt}$$

where $T_c$ = instantaneous temperature (in degrees above ambient)
$t$ = cooling time from $T_M$ Accordingly, as the heater 48 is alternately energized and deenergized, under control of detector 29, the potential of point 45 of network 10 will vary first in one sense and then the other at rates determined by the shape of curve B and by the temperatures of resistor 47 at the times of energization and deenergization.

The lower terminal of rate-setting resistor 44 is connected to point 49 of the measuring network 10 between the resistors 50 and 51, the former having resistance which remains fixed during operation of the control network, and the latter, because of heat received from the associated heater 52, having a resistance, which, again assuming continuous supply of heat to furnace 13, continuously rises until an equilibrium or maximum point is reached.

The thermal inertia of the unit 51, 52 is substantially greater than that of unit 47, 48 so that, assuming continued energization of heater 52, a much longer time is required to raise the resistance of resistor 51 to its maximum or equilibrium value. The resistor and heater coils 51, 52 may, to obtain such characteristic, be wound on a heavy-walled metal tube or metal rod so that its time-temperature characteristic, as generally shown by curve C of Fig. 4, affords a much slower rise and fall of temperature than unit 47, 48. By way of example, the time required for the resistor temperature to change from ambient to $1/e$ of maximum may be of the order of a half hour. Formulae 1 and 2 with different value of B apply to unit 51, 52 in fixing the laws of variation of the point 49 of the control network upon energization and deenergization of heater 52. Thus, the balance point of the bridge, comprising resistors 33, 11, 34, 50 and 51, slowly falls toward the low temperature end of the slidewire 11 during application of heat to the furnace, and slowly rises when the heat input to the furnace is reduced to low or zero value.

Accordingly, with contact structure 41, 42 of the rate-setting impedance or resistance means 43, 44 so set that the potential of the detector input point 40 is at, or proximate to that of, point 45 of the network, the balance point of the bridge 10 shifts rapidly in accordance with curve B toward the potential of point 39 and will oscillate about that point during cyclic unbalancing and rebalancing of network 10 when detector 29 is in control. When, however, the contacts 41, 42 are so adjusted that the potential of point 40 is at, or closely approximates, point 49 of the bridge, the balance point of the bridge 10 shifts slowly in accordance with curve C toward the potential of point 39 and will oscillate slowly about that point. Otherwise stated, when the potentials of points 40 and 45 are the same, the action is a proportional control with a minor rate control, whereas when the potentials of points 40 and 49 are the same, the action is a proportional control with a major rate control.

By moving the "rate-adjusting" contacts 41, 42 to intermediate positions, the automatic shifting of the balance point of the bridge due to the balancing action of the temperature-responsive resistors 47 and 51 may be selected to suit the requirements of different systems or of the same system under different load conditions: for example, for an intermediate setting of contacts 41, 42, the potential of point 40 may be selected to vary in accordance with curve D substantially different from the rate curves B and C above discussed. Thus, in this system, as distinguished from those of my prior Patents Nos. 2,300,537, 2,325,232 and 2,325,308, the "rate" action of the control network may be varied without otherwise modifying the control.

The output of the network 10 may be impressed upon the detector 29 by transformer 53 whose secondary winding 54 is connected to the input electrodes of an amplifier tube 55 in whose output circuit is included the winding of relay 30. The operating voltages for the tube 55 may be supplied by the secondary windings 56, 57 of power transformer 36. For adjustment of the "zero" of the detector, there may be provided a manually-adjustable biasing voltage derived from slidewire 58 connected to secondary 59 of transformer 36. The sensitivity of the detector to unbalance of the network 10 may be varied by adjustment of the rheostat 60 in shunt to the primary of transformer 53: the setting of control 60, other factors remaining the same, determines the pulsing period of the network and detector combination. It shall be understood that any other detector suitable to effect, in accordance with unbalance of bridge 10, energization or deenergization of the relay 26 and of the temperature-responsive devices 47, 48 and 51, 52, or equivalent, may be utilized.

The throttling range resistors 61 and 62 are selectively connected in shunt to the control slidewire 11 under control of the relay 32, and are so proportioned or adjusted that when the slidewire 11 is shunted by resistor 61, there is afforded a wide throttling range, whereas when the resistor 62 is in shunt to slidewire 11, there is afforded a narrow throttling range.

As appears from Table A, the relay 32 is energized upon closure of switch L when the temperature, rising or falling, is in range #1. Concurrently with movement of its contact 63 into engagement with contacts 64 for connection of the wide throttling range resistor in shunt to control slidewire 11, the contact 65 of the relay engages fixed contacts 66 to complete, through switch L₁, a lock-in circuit for the relay. When the temperature rises from range #1 to range #2, switch L opens but the relay 32 remains energized, through the lock-in circuit, until the temperature rises to or slightly above the control point whereupon switch L₁ opens to break the lock-in circuit. Upon resultant deenergization of relay 32, its movable contact 63 moves out of engagement with contact 64 to disconnect the wide-range throttling resistor 61 and re-engages contacts 67 to re-connect the narrow throttling range resistor 62 in shunt to the control slidewire. The relay 32 remains deenergized until the temperature again falls back into range #1 as in the next run of a batch process.

As shown in Fig. 3, when the system is under narrow-range throttling control, curve N, the proportioning of Heat-On time occurs within a narrow range of movement of the control slidewire, the heat input to the furnace 13 being continuously "on" and "off" respectively for lower and high temperatures. On the other hand, when the system is under wide-range throttling control, curve W, the proportioning of Heat-On time occurs within a wide range of movement of the slidewire below the control point. Preferably, as above described, there is a transition from the wide to narrow throttling control when the temperature in rising from abnormally low value attains the desired control temperature.

For purpose of further explanation, it will be assumed that the furnace 13 is operating near the end of a run, point E, Fig. 5, with the work temperature, curve T, maintained at or near the control point at which time the control network is under narrow throttling-range control. The agent-controlling relay 26 is therefore under control of the cyclically unbalanced and rebalanced measuring network 10, and is intermittently energized and deenergized for short periods whose relative duration depends upon the average heat input required to maintain the furnace load at an equilibrium temperature within that range. Under these conditions assumed, the relay 32 is deenergized because switches L and L₁ have opened long prior in the control cycle, and the relay 26 is under the control of detector output relay 30 because switch L₃ has opened long prior in the control cycle. Accordingly, as the temperature of the furnace falls below the balance point of the bridge, which now corresponds with or closely approximates the control point, the detector 29 responds to energize the relay 30 and effect closure of the circuit of heater 28 of the furnace. Concurrently therewith, the heaters 48 and 52 for the temperature-responsive resistors 47 and 51 are energized. When the resistance of resistors 47 and 51 rises sufficiently to restore balance of the control network 10 for the selected setting of rate-contacts 41, 42, the relay 30 is deenergized to cut off further supply of heat by resistor 28 to the furnace and to disconnect the heaters 48, 52. Upon deenergization of the heaters 48, 52, they cool to unbalance the bridge and the cycling repeats, with proportioning of the ratio of "on" to "off" periods to maintain the furnace temperature at the control point.

Now assuming that the work is removed from the furnace and a new load introduced, the temperature of the furnace will usually fall within range #1 of the control slidewire 11 so that for a substantial period of time (P₁, Fig. 5), the relay 26 is continuously energized under control of the switch L₃, and the heaters 48, 52 of the control network 10 are concurrently continuously energized to shift the balance point of the control network to substantial extent in the low temperature direction. After a period of time, dependent upon the mass and character of the load and of the furnace construction, the furnace or work temperature as detected by the thermocouple begins to rise.

The primary purpose of a control system having the features herein stressed is to provide for heating of the batch of work to the desired temperature within a minimum time and without overshooting the control point. The problem is present in many processes, but is particularly bothersome in typical aluminum melting pot or similar process where a long detecting lag is combined with high heat storage in the heating chamber. The difficulty of preventing overshoot is further increased because the melt in going from solid to liquid condition does not change in temperature even though the heat input to the furnace is continued at a high level. The control system above described solves this problem by providing for selection of the proper rate action to minimize overshooting of the control in combination with an automatic change of the throttling-range to provide for close control after the new load has been heated to the control point.

Before introduction of the new batch, the measuring network 10, as above stated, was operating within the narrow throttling range, but upon introduction of the new load into the furnace, the movement of the control slidewire 11 into the #1 range effected closure of switch L, with consequent energization of relay 32. The relay contact 63 thereupon moved from the narrow throttling range contact 67 into engagement with the wide throttling range contact 64 as the furnace temperature reached point F, Fig. 5. Switch L₁ and contact 65 of the relay 32 completed a seal-in circuit so that the relay remains energized for wide throttling range control effective when the rising temperature reaches point G, the transition from ranges #2 to #3, and remains effective until the rising furnace temperatures reach the control point, whereupon switch L₁ opens to break the hold-in circuit of the relay to re-establish narrow throttling-range control. Further operation of the system is the same as previously described in connection with the prior batch.

Assuming no provision has been made for shift of the control to wide throttling-range control at point F, the heat would have been continuously applied to the furnace until the work temperature came within the narrow throttling range, and consequently there would have been an overshoot of the work temperature. However, with the control system disclosed, which provides for a wide throttling range as the temperature of the new charge is rising, the control network is operative for cycling "on-off" control of the heat input to the furnace throughout the period P₂ beginning well before the temperature arrives at the lower limit of the narrow throttling range. Consequently, the rate control action of the measuring network 10 is effective to bring the rising work temperature to the control point along a time-temperature curve determined by the selected setting of the contacts 41, 42 of the control network. With the optimum setting, the work will be brought to the control point in minimum time with no overshoot.

During the initial stages of a run, that is, for ranges #1 and #2, when full heat is being applied to the furnace, heat is also being continuously supplied to the heaters 48, 52 of the control network, and the balance of the control bridge is therefore shifted toward the low temperature end because of the increased resistance of the coils 47 and 51. Therefore, with the wide throttling-range resistor 61 in circuit, when switch L₃ opens, as the temperature rises from range #2 to range #3, the relay 30 is deenergized so that the heat to the furnace is turned off at point G and the control network heaters 48 and 52 are also deenergized. Notwithstanding deenergization of heater 28, the temperature as measured by thermocouple 14 may continue to rise due to thermal lag. Should the work temperature approach the control point at such rate that the potential of the point 39 of the measuring network changes more slowly than the potential of point 40, due to the cooling of the coils 47 and 51, the bridge becomes unbalanced in opposite direction and the relay 30 is energized again to supply heat to the furnace and to the heaters 48 and 52 of the control network. The slower the work temperature tends to approach the control point, or the further the rate control contacts 41, 42 have been adjusted toward the point 45, the higher the rate of input to the furnace prior to attainment of control point temperature. Conversely, should the work temperature tend to approach the control point more rapidly, or the further the rate action adjustment has been turned toward point 49, the lower will be the heat input to the furnace as it approaches the control point temperature. The rate of change of temperature of the furnace, once it has come within the wide throttling range, itself, under control of the cyclically unbalanced and rebalanced network 10, modifies the amount of heat that is applied until the work temperature attains the control point.

As should be evident to those skilled in the art, the system described may be used for control of process variables other than temperature by substitution of an appropriate responsive device for the thermocouple 14 or equivalent temperature-responsive device and by substitution for resistor 28 of an appropriate agent-controlling or supplying device: in a chemical control, for example, the thermocouple 14 may be replaced by a pH cell and the resistor 28 by an electromagnetically-operated valve.

It shall further be understood the serially connected slidewires 43, 44 may be replaced by a single slidewire whose terminals are respectively connected to points 45, 49 of the network and whose relatively adjustable contact is connected to detector input terminal 40. The dual arrangement is preferred because affording a wider range of rate selections without recourse to a slidewire of extremely high resistance.

Figure 6:
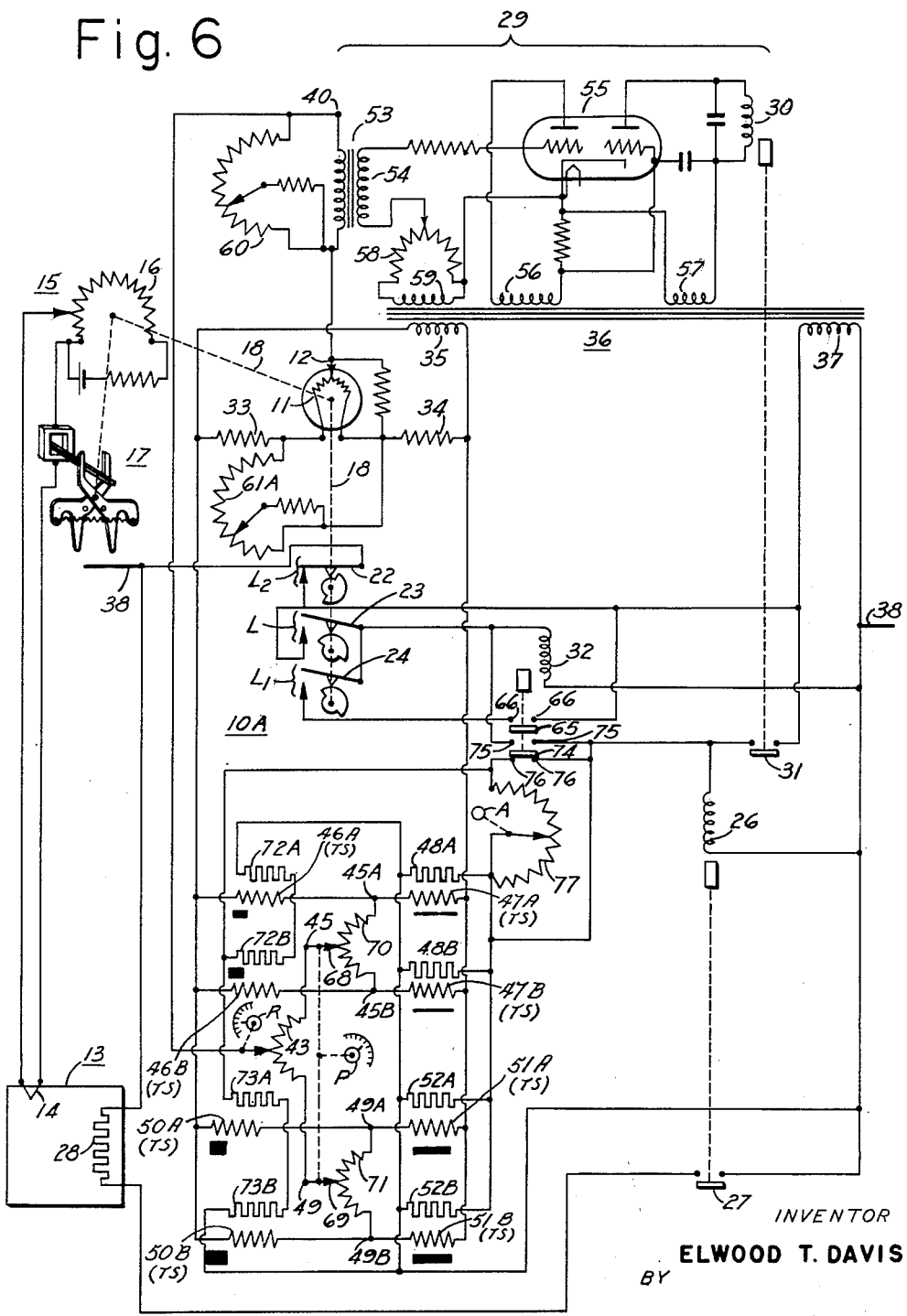
Figs. 6 to 10 are circuit diagrams of other control systems embodying various modifications of the invention.

In the modification shown in Fig. 6, like that of Fig. 1, a manual adjustment, exemplified by knob R, is provided for selection of a predetermined "rate" control action and there is provision for manual adjustment of the proportional control action by rheostat 61A in addition, there is provision for an adjustable droop-corrective action. The adjustable droop-corrective action is a slow unbalancing action which shifts the balance point of network 10A toward the control point at a selected slow speed. Furthermore, the circuit arrangement, later described, is such that changes in setting of the "rate" adjustment does not affect the proportional speed droop-corrective action, and vice versa. Though not included in the particular system shown in Fig. 6, there may be, as in the system of Fig. 1, provision for automatic adjustment of the width of the throttling range as the controlled variable passes from one to another range of magnitude.

Reverting to Fig. 1, it will be recalled that system included no provision for a proportional speed droop-corrective action, the rate at which the potentials of points 45 and 49 of its network varied during the heating and cooling periods of the cycle being determined solely by the prechosen characteristics of the temperature-responsive units 47, 48 and 51, 52. With the modified control network 10A of Fig. 6, selection of different speeds of automatic droop-correction may be effected by adjustment of a second control knob P which effects concurrent adjustment of the mechanically coupled contacts 68, 69 of voltage-divider slidewires 70 and 71.

The slidewire 70 is connected between points 45A and 45B to shunt branches of the control network, one branch including resistors 46A, 47A in series, and the other branch including resistors 46B, 47B in series. The resistors 47A, 47B, like resistor 47 of Fig. 1, are of conductive material having appreciable temperature coefficient of resistance and are so disposed in the network as to provide "proportional" control action. When the heaters 48A, 48B respectively intimately thermally associated with the resistors 47A, 47B are concurrently energized, the resistances of the resistors increase but these two temperature-responsive units are constructed to follow the same time/resistance curves; hence the "rate" control action and the "proportional" control action of these two units are the same. Conversely, when heaters 48A, 48B are deenergized, the resistances of resistors 47A, 47B decrease at the same rate. Accordingly, the difference of potential between points 45A and 45B is not affected by the heating and cooling of resistors 47A, 47B. However, the time/resistance characteristics of the droop-corrective units 46A, 72A and 46B, 72B are substantially dissimilar. In consequence, the potential of point 45 may be selected to follow any of various speeds of droop-corrective action by adjustment of contact 68 and such selection is without effect upon the rate and proportional control action of units 47A, 48A and 47B, 48B.

Similarly, the slidewire 71 is connected between points 49A and 49B of the two lower shunt branches of the network, one branch including resistors 50A, 51A in series, and the other branch including resistors 50B and 51B in series. With each of the resistors 51A and 51B, there is respectively associated a heater 52A, 52B for causing the resistance to vary as a function of time during the energization and deenergization periods of the heaters. The time/resistance curves of the two proportional control units 51A, 52A and 51B, 52B are similar so that the difference of potential between points 49A and 49B is not affected by heating and cooling of these units. However, the time/resistance curves of the droop-corrective units 50A, 73A and 50B, 73B are dissimilar and in consequence, the potential of point 49 may be selected to follow any of various speeds of droop-corrective action by adjustment of contact 69. Such selection is independent of the rate control action and proportional control action of units 51A, 52A and 51B, 52B.

The units 47A, 48A and 47B, 48B are constructed to have the same proportional control action as units 51A, 52A, and 51B, 52B but to have a different rate action: the two pairs of units approach the same ultimate temperature and therefore provide the same proportional action, but the rates of approach are different for the different pairs and therefore provide different rate actions.

By coupling the contacts 68, 69 of the impedance means, slidewires 70, 71, for adjustment in unison in like sense, it is insured that the selection of different speeds of droop-correction by adjustment of knob P has no effect upon the "rate" control action as selected by adjustment of knob R which moves the contact structure of the impedance means, slidewire 43. Thus, in this system, as distinguished from those of my aforesaid prior patents, the "rate" and "droop-correction" control actions may be individually and independently adjusted.

As symbolically indicated in Fig. 6, the thermal inertia of droop-corrective unit 46A, 72A is somewhat greater than the thermal inertia of the units 47A, 48A and 47B, 48B; the thermal inertia of the droop-corrective unit 46B, 72B is much greater than that of unit 46A, 72A; the thermal inertia of droop-corrective unit 50A, 73A is somewhat greater than that of units 51A, 52A and 51B, 52B; and the thermal inertia of droop-corrective unit 50B, 73B is substantially greater than that of unit 50A, 73A. Also as symbolically indicated, the thermal inertias of units 47A, 48A and 47B, 48B are equal to each other but less than the thermal inertias of units 51A, 52A and 5IB, 52B which latter are also equal to each other.

In the arrangement shown in Fig. 6, the cam switch L3 is omitted and relay 32 is provided with a movable contact 74 which, when relay 32 is energized, engages fixed contacts 75, 75 to complete the heater circuit independently of the detector-controlled relay 30. With relay 32 deenergized and so long as cam switch L2 remains closed, as it does for slidewire ranges #1 to #4, Fig. 1, the heaters are energized and deenergized through contact 31 under control of the detector relay 30—see Table B below.

Preferably, the current supplied to the heaters 72A, 72B, 73A, 73B of the droop-correction resistors 46A, 46B, 50A, 50B is of higher value when the heaters are intermittently energized under control of relay 30 than when continuously energized during continued energization of relay 32. To that end, as shown in the system of Fig. 6, the "rate of approach" rheostat 77 is effectively in series with the heaters 72A, 72B, 73A, 73B so long as movable contact 74 of relay 32 is in engagement with fixed contacts 75, 75. When relay 32 is deenergized, its movable contact 74 shifts to engagement with fixed contacts 76, 76 to short out or shunt the rheostat 77 so that upon closure of contact 31 of detector relay 30, a heavier heating current traverses the heaters 72A, 72B, 73A, 73B for the droop-correction resistors. The adjustment of knob A of rheostat 77 determines the initial location of the throttling range with respect to the control point as the work, in a batch process, is heated at the beginning of a run to raise its temperature toward the control point; specifically the low end of the throttling range is adjustably brought below the control point to effect reduction of heat input prior to attainment of the control point to avoid overshooting.

The designation of knob R as the "rate" control adjustment and of knob P as the "droop-corrective" adjustment is based upon the relation above stated concerning the thermal inertias of the various heater-resistor units. The knob R of resistor 43 and knob P of resistors 70, 71 however become the droop-corrective knob and rate control knobs respectively if the thermal-inertias of the heater-resistor units in the two upper droop-corrective arms are similar to each other but different from the thermal inertia of the heater-resistor units in the two lower droop-corrective arms; if the thermal inertias of the heater-resistor units in the two upper proportional arms are dissimilar to each other and each smaller than the thermal inertia of the unit in the corresponding droop-arm; and if the thermal inertias of the units in the two lower proportional arms are dissimilar to each other and each smaller than the thermal inertia of the unit in the corresponding droop-arm.

Figure 11:
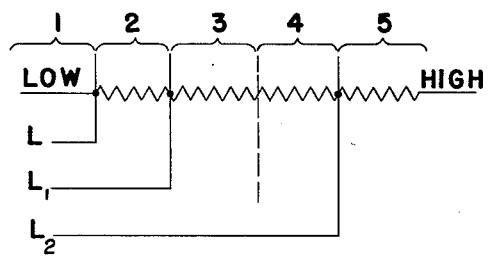
Fig. 11 is an explanatory figure correlating different control ranges to the control slidewire of Figs. 6 to 10.

From Fig. 11 and Table B, the operation of the control system of Fig. 6 in view of prior description of Figs. 1 to 5 should be evident to those skilled in the art, and, accordingly, detailed description thereof is omitted.

Figure 7:
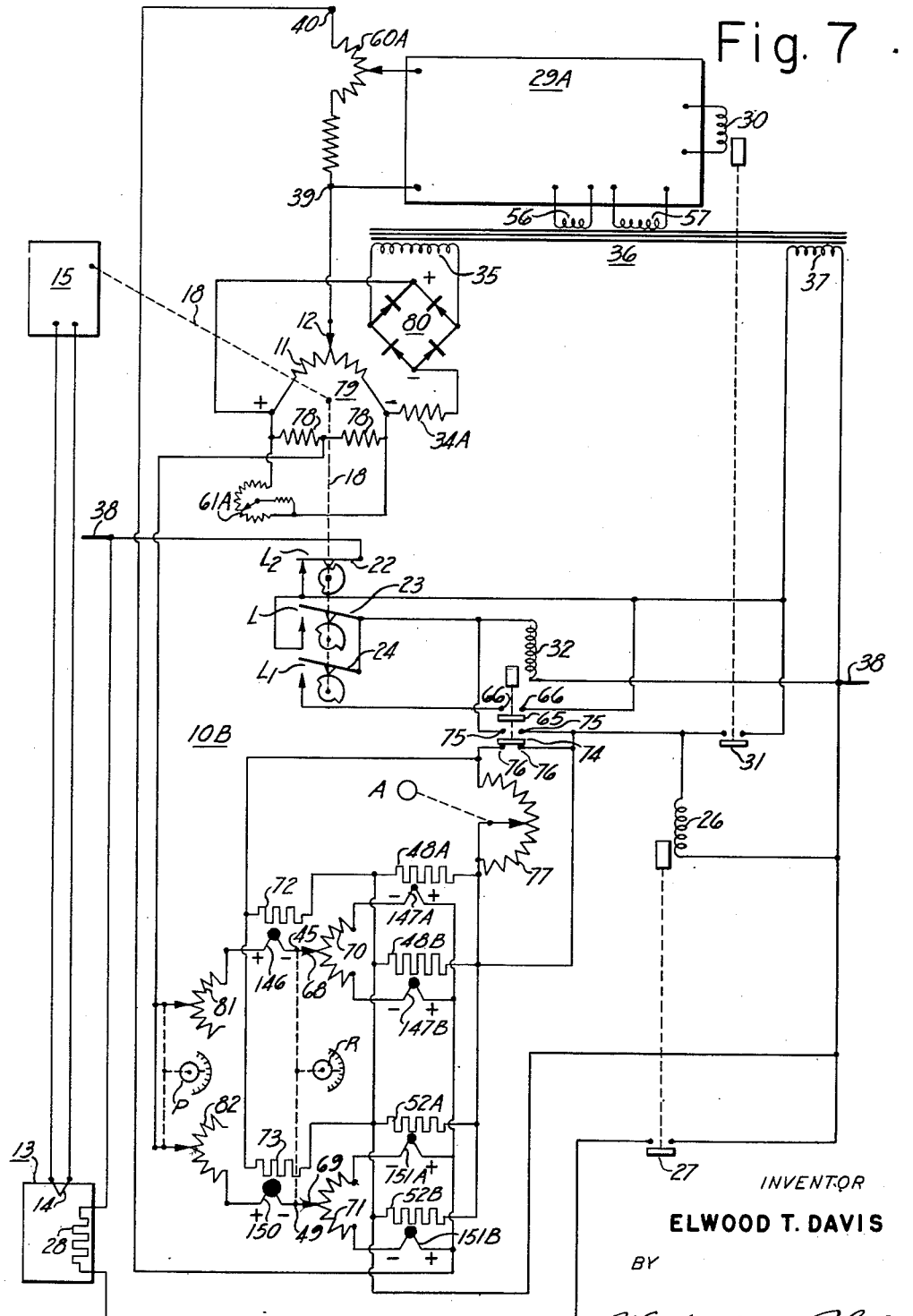

In the modification shown in Fig. 7, like that of Fig. 6, the "rate" control action and the speed of droop-correction may be individually adjusted, each without effect upon the other. The principal difference between the control network 10B of Fig. 7 and the corresponding control networks of Figs. 1 and 6 is that the cycling elements are thermocouples connected with proper relative poling and which of themselves, or in association with their respective heating coils, have the required time-temperature-voltage characteristics. Though not shown in Fig. 7, this system may include, as in Fig. 1, provision for automatic transition from wide to narrow throttling range: in the particular arrangement shown in Fig. 7, the rheostat 61A in shunt to the control slidewire 11 is manually adjustable to permit selection of different throttling ranges known or found to be best suited for the particular system controlled.

In the arrangement of Fig. 7, the control slidewire 11 and the resistors 78, 78 form a Wheatstone bridge 79 which is balanced when the contact 12 is at the control point and which may be supplied with direct current from any suitable source. In Fig. 7, the supply source for bridge 79 comprises the full-wave rectifier 80 and the secondary winding 35 of transformer 36.

The output voltage of bridge 79 is of magnitude and polarity dependent upon the extent and sense of deviation of the process variable from the control point; this output voltage is applied to the input terminals 39, 40 of amplifier-detector 29A in series with the resultant of the voltages produced by the thermocouples 146, 147A, 147B, 150, 151A, and 151B. In this system, the detector amplifier should be of the direct current type, or if of the alternating current type should include an inverter, such, for example, as disclosed in Williams Patent No. 2,367,746.

Assuming the process variable is at the control point and that the thermocouples are all generating equal voltages, the signal voltage applied to the input terminals of amplifier 29A is zero. Now assuming the control slidewire 11 is moved in clockwise direction in response to the change in the process variable, specifically in response to drop in temperature of furnace 13, the output of bridge 79 is effective to cause energization of relay 30. The resultant closure of relay contact 31 effects energization of heater coils 48A, 48B, 52A, 52B, 72 and 73, and also of contactor 26. Accordingly, concurrently with supply of heat to the furnace 13, heat is applied to raise the temperatures and therefore the output voltages of the thermocouples of network 10B. As indicated in Fig. 7 the thermocouple 146 is poled in opposition to each of the thermocouples 147A and 147B in series with it in the upper branch of the cycling network. Similarly, the thermocouple 150, which is of the same poling as thermocouple 146, is poled opposite to each of the thermocouples 151A and 151B connected in series with it in the lower branch of the cycling network. The construction of each of these temperature-responsive units is such that all thermocouples would, for continued energization of their heat-

*Table B*

| Range | L | L₁ | L₂ | Relay 32 | Relay 30 | Relay 26 |
|---|---|---|---|---|---|---|
| #1 | Closed | Closed | Closed | In | Not effective | In. |
| #2 | Open | ---do--- | ---do--- | {In (rising #1–#2)<br>{Out (falling #3–#2) | ---do--- | Do. |
| #3 | ---do--- | Open | ---do--- | Out | On-off detector controlled | On-off relay 30-controlled. |
| #4 | ---do--- | ---do--- | ---do--- | ---do--- | ---do--- | Do. |
| #5 | ---do--- | ---do--- | Open | ---do--- | Out | Out. | ers, reach the same ultimate temperature. However, the winding form for heater 72 and to which thermocouple 146 is attached possesses somewhat greater thermal inertia than the forms on which heaters 48A and 48B are wound and the thermal inertia of the form for heater 48A is somewhat less than that of the form for heater 48B. Similarly, the thermal inertia of heater-thermocouple unit 73, 150 is much greater than the thermal inertias of the units 52A, 151A and 52B, 151B, and the thermal inertia of unit 52B, 151B is greater than that of unit 52A, 151A. The thermal inertia of each of units 52A, 151A and 52B, 151B is greater than that of units 48A, 147A and 48B, 147B to provide a corresponding wide range of adjustment of the "rate" control action. The thermal inertia of the droop-correction unit 72, 146 is greater than that of either of the units 48A, 147A; 48B, 147B. Therefore initially upon energization of the heaters, the output voltages generated by thermocouples 147A, 147B and 151A, 151B rise more rapidly than the respectively opposed voltages produced by thermocouples 146 and 150. Consequently, after a relatively short time the resultant of the thermocouple voltages rebalances the output voltage of bridge 79 and relay 30 is deenergized. Because of opening of relay contact 31, all thermocouples begin to cool concurrently with reduction of heat input to the furnace 13 and the cycling repeats generally as described in connection with the preceding modifications and as will be understood from Table B.

The knob R which in unison adjusts the contacts 68, 69 of slidewires 70 and 71 may be moved to different settings to obtain different predetermined "rate" control actions and knob P, which complementarily adjusts the slidewires 81 and 82, may be moved to different settings to obtain different predetermined speeds of droop-correction.

Figure 7A:
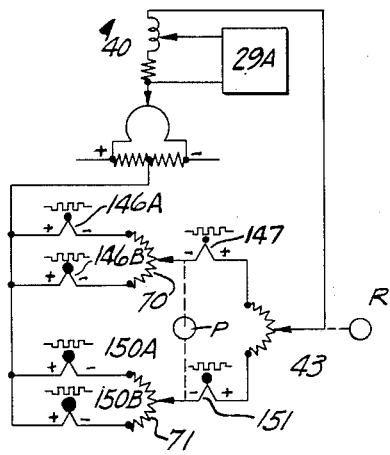
Figure 7B:
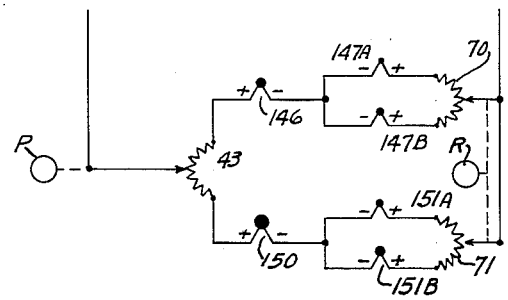
Figure 7C:
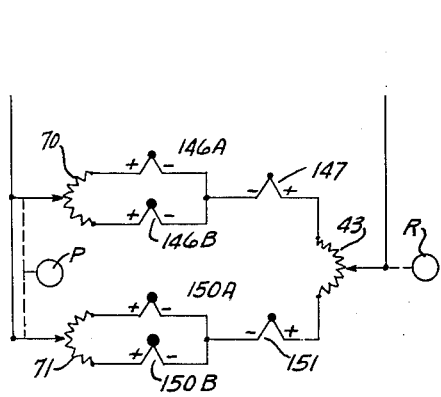

The functions of the two control knobs may be interchanged by modifying the control network 10B in manner indicated in Figs. 7A, 7B, 7C, the thermal inertias of the various units being symbolically indicated.

Figure 8A:
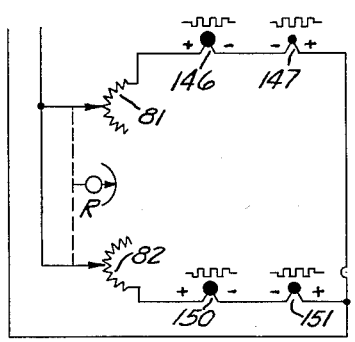

The system disclosed in Fig. 8 is similar to that of Fig. 7 in that thermocouples or voltage-generating devices are utilized as the rebalancing elements of the control network, but is simpler in that by selection of the thermal inertias of the devices there may be obtained either a variable "rate" control with fixed droop-correction or a variable droop-correction with fixed rate action. For the latter, the heater-thermocouple units 48A, 147A and 48B, 147B of Fig. 7 may be replaced by the single unit 48, 147 of network 10C, Fig. 8, and heater-thermocouple units 52A, 151A and 52B, 151B of Fig. 7 may be replaced by the single unit 52, 151: the relative thermal inertias of the units are as symbolically indicated. For fixed droop-correction with variable rate action, the relative thermal inertias of the thermocouple devices are as symbolically indicated in Fig. 8A: i. e., the thermal inertias of the droop-correction units 146, 150 are substantially equal and larger than either of that of either of the rate action units 147, 151. In other respects the systems are of similar composition and the operation of the control arrangement of Fig. 8 should be understood from Fig. 11 and Table B and description of the operation of preceding systems. If desired, the system of Fig. 8, like all systems herein disclosed, may incorporate the arrangement shown in Fig. 1 for automatic transition from a wide to a narrow throttling-range in dependence upon the prior history of the process variable.

Figure 9:
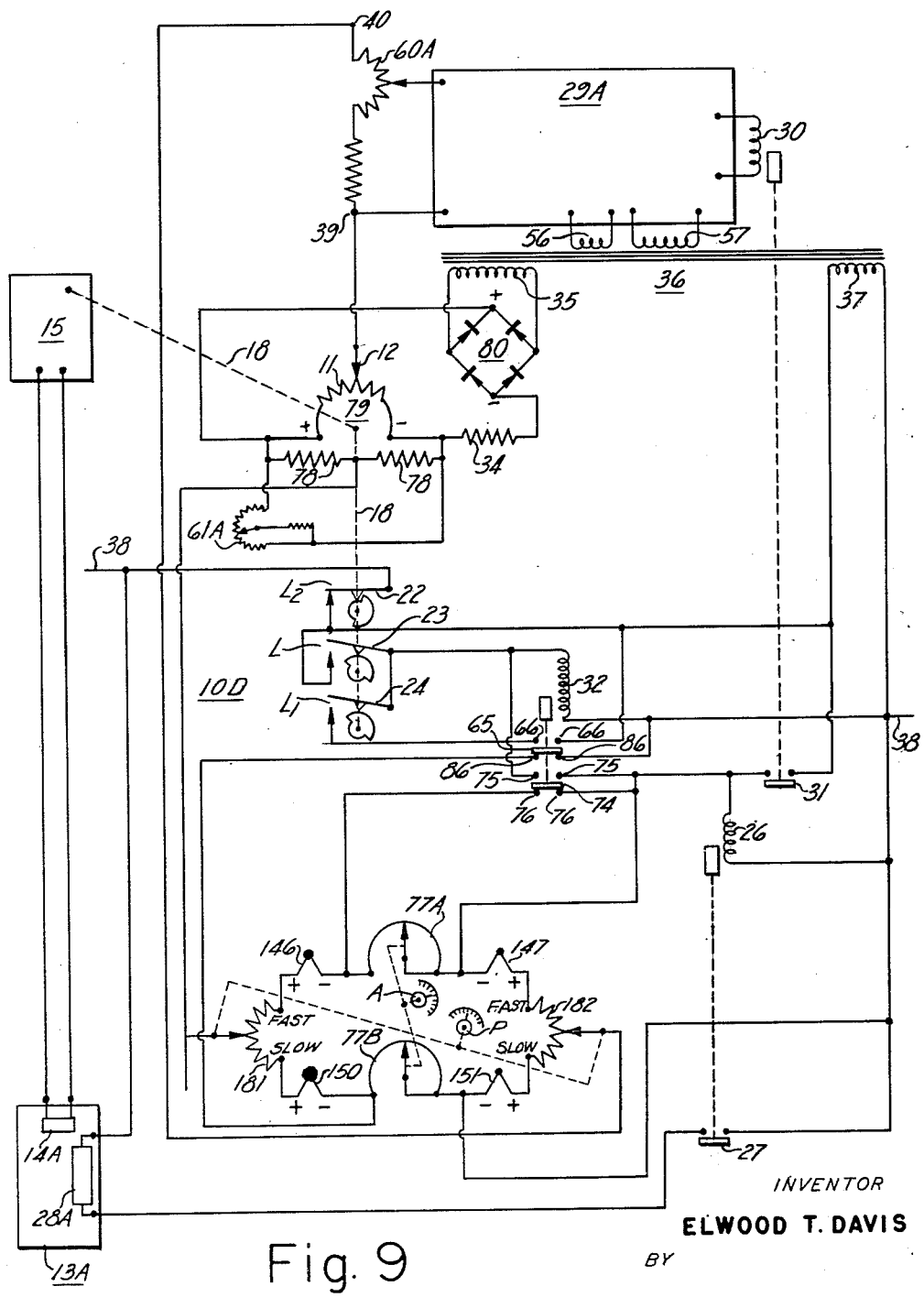

The control system of Fig. 9, when the thermal inertias of thermocouples 146, 147, 150 and 151 are as symbolically indicated, provides for selection of different speeds of droop-correction, the rate action remaining fixed. It differs from preceding modifications in that the thermo-sensitive cycling elements are not provided with heaters. Instead the thermocouples are heated by passage directly through them of heating current whose magnitude is automatically increased and decreased concurrently with change of agent input to the controlled system. The thermocouples 146, 147 of control network 10D, Fig. 9, are, as in Fig. 8, in series-opposition in the upper branch of the cycling network, and thermocouples 150, 151 are in series-opposition in the lower branch of that network, all as shown by conventional polarity symbols in Fig. 9. These four thermocouples form a bridge network whose direct current output voltage is in series with the unbalanced voltage of the bridge network 79 jointly to supply the signal voltage of the detector 29A. The alternating current for directly heating the thermocouples may conveniently be supplied from the line conductors 38, 38 by circuit connections, as later described, by contacts of relays 30 and 32. As the A. C. input and D. C. output circuits of the thermocouple bridge are in conjugate arms thereof, they are effectively isolated when the bridge is balanced.

With relay 32 energized, Table B, heating current is continuously supplied to the thermocouple bridge through a circuit including the contacts 74, 75—75 of relay 32. With relay 32 deenergized, Table B, heating current is intermittently supplied to the thermocouple bridge through movable contact 31 of the detector relay 30. By adjustment of rheostats 77A, 77B, different rates of approach may be selected: these rheostats are effectively short-circuited to increase the heating current in the droop-corrective units when relay 32 is deenergized, the purpose being the same as above discussed in connection with short-circuiting of rheostat 77 in Fig. 6.

To provide for selection of different rates of droop-corrective action, the potential-dividing resistors 181, 182 are respectively connected between thermocouples 146, 150 and 147, 151. The adjustable contacts of rheostats 181, 182 are respectively connected to input terminal 40 of detector 29A and to the common terminal of resistors 78, 78 of the bridge network 79 which includes the automatically adjustable control slidewire 11. The adjustable contacts of potentiometers 181, 182 are mechanically coupled to the control knob P for adjustment in unison.

By employing thermocouple 146, 150 of substantially equal thermal inertias large compared to the thermal inertias of 147, 151 (now different) the adjustment of knob P will afford selection of different rate actions, the droop-corrective action remaining fixed.

Figure 10:
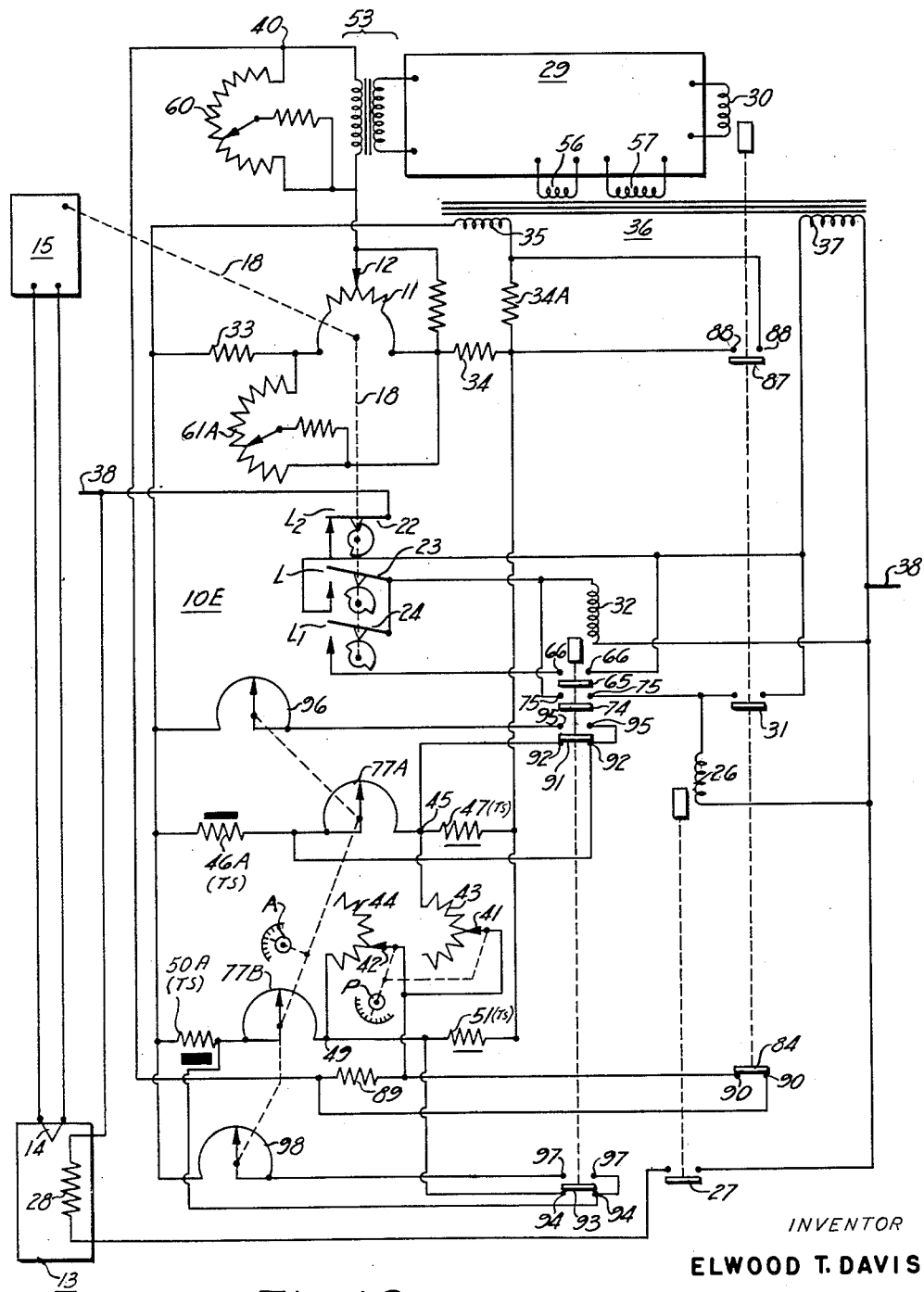

The control system of Fig. 10 is similar to that of Fig. 9 in that heaters for the thermo-sensitive devices of the control network are omitted and the thermoresponsive devices directly heated by passage through them of the heating current. Control network 10E, Fig. 10, is also similar to Fig. 9 and other preceding modifications in that there is provision for adjustable droop-corrective action with fixed rate action, or adjustable rate action with fixed droop-correction. It is similar to the systems of Figs. 1 and 6, in that there are used temperature-sensitive resistors instead of thermocouples.

Under conditions for which relay 30 is energized, Table B, the contact 87 of relay 30 engages fixed contacts 88, 88 to shunt current-limiting resistor 34A which is in series with the secondary 35 of supply transformer 36 and the resistors 46A, 47, 50A and 51 of the control network 10E. The resulting increase in magnitude of the current traversing these resistors causes their temperatures and their resistances to rise at rates determined by their thermal inertias, as explained in connection with preceding modifications. When balance is re-attained, the relay 30 is deenergized and its contacts 87, 88—88 separate to reinsert resistor 34A in the supply circuit so to reduce the heating current for initiation of the cooling period of the control cycle.

To compensate for the effect of increased magnitudes of supply current upon the sensitivity of the balanceable control network, the resistor 89 is cut into the output circuit of the control network by disengagement of contacts 84, 90—90 of relay 30 at the same time that resistor 34 is short-circuited to increase the heating current. Conversely, when relay 30 is deenergized, its contact 84 re-engages contacts 90, 90 to short-circuit resistor 89 in the signal or output circuit concurrently with separation of contacts 87, 88—88 for re-insertion of resistor 34A in the power supply circuit. Thus, the sensitivity is maintained substantially constant notwithstanding the changes in magnitude of the supply current to the control network 10E.

With relay 32 deenergized, Table B, its movable contact 91 is in engagement with fixed contacts 92, 92 to short-circuit the rheostat 77A connected between thermoresponsive resistors 46A, 47 and its movable contact 93 is in engagement with fixed contacts 94, 94 to short-circuit the rheostat 77B connected between thermoresponsive resistors 50A, 51. When relay 32 is re-energized, movement of contact 91 from engagement with contacts 92, 92 and into engagement with contacts 95, 95 effectively connects the rheostat 77A in series between resistors 46A and 47 and concurrently connects the control rheostat 96 in shunt to the thermosensitive resistor 46A. Also, when relay 32 is reenergized, movement of contact 93 from engagement with contacts 94, 94 into engagement with contacts 97, 97 effectively re-connects the rheostat 77B in series between the thermosensitive resistors 50A, 51 and connects the control rheostat 98 in shunt to the thermosensitive resistor 50A. The rheostats 96, 77A, 77B and 98 are ganged for manual adjustment in unison and are so mechanically or electrically connected that concurrently with increase of resistance of rheostats 77A, 77B there is decrease of resistance of rheostats 96, 98, and vice versa. Thus the current through the droop-corrective units is substantially different for the different positions of relay 32 whereas the heating current for the "rate" units is substantially the same for either position of that relay.

The rheostats 96, 77A, 77B and 98 adjustable by the "rate of approach" knob A therefore generally serve the purpose of rheostat 77 of Figs. 6 and 7.

With the relative thermal inertias of the units as shown in Fig. 10, the adjustment of knob P affords selection of different speeds of droop-correction, the rate control action being fixed. By employing resistors 46A, 50A of equal thermal inertias large compared to the thermal inertia (now different) of resistors 47, 51, the adjustment of knob P affords selection of different rate control actions, the speed of droop-correction remaining fixed.

In any of the foregoing systems, the output of the detector may be used to vary the heating current to the control network by arrangements other than those specifically herein shown and including, for example, those shown in my copending application Serial No. 630,400, now Patent No. 2,496,860.

What is claimed is:

1. A control system characterized by provision for selection of different second-derivative control actions comprising a balanceable network, impedance means in said network adjustable to unbalance said network, a detector responsive to unbalance of said network, first temperature-responsive means controlled by said detector for reducing said unbalance at a predetermined rate, second temperature-responsive means controlled by said detector and having a greater thermal inertia than said first temperature-responsive means for reducing said unbalance at a significantly slower rate, and impedance means in circuit with said detector and said first and second temperature-responsive means and having contact structure adjustable to select rates of unbalance-reduction within a range defined by said predetermined rate and said slower rate.

2. A system as in claim 1 in which means responsive to a process variable is coupled to the first-named impedance means to effect adjustment thereof in accordance with said process variable and in which structure for controlling the supply of an agent affecting said process variable is controlled by the detector whereby adjustment of the contact structure of the last-named impedance means also varies the extent to which the average input of the agent is varied during change of said process variable.

3. A system as defined in claim 1 in which the temperature-responsive devices are resistors having appreciable temperature coefficients of resistance.

4. A system as defined in claim 1 in which the temperature-responsive devices are resistors having appreciable temperature coefficients of resistance and with each of which is intimately thermally associated an auxiliary heater resistor energized under control of the detector.

5. A system as defined in claim 1 in which the temperature-responsive devices are solely resistors having appreciable temperature coefficients of resistance and in circuit with a source of heating current controlled by said detector.

6. A system as defined in claim 1 in which the temperature-responsive devices are thermocouples heated under control of the detector and included with like poling in shunt branches of said balanceable network respectively to produce the potentials of said points thereof.

7. A system as defined in claim 1 in which the temperature-responsive devices are thermocouples included with like poling in shunt branches of said balanceable network respectively to produce the potentials of said points thereof and in which heater resistors for the respective thermocouples are energized under control of the detector.

8. A system as defined in claim 1 in which the temperature-responsive devices are thermocouples in circuit with a source of heating current controlled by said detector respectively to produce the potentials of said points of the balanceable network.

9. A control system characterized by provision for selection of different second-derivative control actions and, independently thereof, for selection of different speeds of droop-corrective actions comprising a balanceable network, a detector responsive to unbalance of said network, a first balancing means including temperature-responsive means controlled by said detector for reducing said unbalance at a predetermined fast rate, a second balancing means including temperature-responsive means controlled by said detector and having greater thermal inertia than said first-named temperature-responsive means for reducing said unbalance at a predetermined less fast rate, a first unbalancing means including temperature-responsive means controlled by said detector for increasing the unbalance at a predetermined slow rate, a second unbalancing means including temperature-responsive means controlled by said detector and having a greater thermal inertia than the last-named temperature-responsive means for increasing the unbalance at a predetermined slower rate, impedance means having contacts respectively associated with the temperature-responsive means of said first and second balancing means and adjustable in unison to select rates of unbalance-reduction within the range defined by said predetermined fast and less fast rates, and impedance means in circuit between said contacts, associated with said first and second unbalancing means and having contact structure adjustable to select rates of unbalance-increase within the range defined by said predetermined slow and slower rates.

10. A system as in claim 9 in which means responsive to a process variable shifts the balance point of the network in accordance with the magnitude of a process variable and in which structure for controlling the supply of an agent affecting said process variable is controlled by the detector, whereby adjustment of the first impedance means selects the rate at which balance of the network is approached for the existing magnitude of the process variable and adjustment of the second impedance means selects the rate at which the magnitude of the process variable is returned toward a predetermined fixed magnitude.

11. A control system as in claim 9 in which each of the balancing means comprises a pair of temperature-responsive units of equal small thermal inertias and each comprising a resistor heated under control of the detector, the equal thermal inertias of one pair being greater than the equal thermal inertias of the other pair, in which each of the unbalancing means comprises a pair of temperature-responsive units of large unequal thermal inertias and each comprising a resistor heated under control of the detector and connected in series with one resistor of the balancing means, in which the first-named impedance means comprises slidewires respectively connected in circuit with the pairs of balancing resistors and whose contacts are adjusted in unison for selection of any second-derivative control action within the range defined by the different thermal inertias of the pairs of units of the balancing means, and in which the last-named impedance means comprises a slidewire in circuit with said contacts of the first-named impedance and whose contact is adjustable to select speed of droop-correction within the range defined by the different thermal inertias of the pairs of units of the unbalancing means.

12. A control system as in claim 9 in which each of the balancing means comprises a pair of temperature-responsive units each comprising a thermocouple and heating means therefor controlled by the detector, each pair of thermocouples being connected in series-opposition through a slidewire, in which each of the unbalancing means comprises a thermocouple and heating means therefor controlled by the detector, in which the contacts of said slidewires are adjustable in unison for selection of different rates of balance-reduction, and in which thermocouples of the unbalancing means are connected in series-opposition between said slidewire contacts and in series with a slidewire whose contact is adjustable to select different speeds of droop-correction.

13. A control system characterized by provision for selection of different second-derivative control actions and, independently thereof, for selection of different speeds of droop-corrective actions comprising a balanceable network, a detector responsive to unbalance of said network, said network including two pairs of parallel branches each comprising two serially-connected temperature-sensitive resistor units having different thermal inertias and heated under control of the detector, a pair of slidewires, one for each pair of branches and having its opposite terminals respectively connected to the junctions of the units in the respective branches of the pair, said slidewires having their contacts adjustable in unison for selection of different speeds of one of said control actions, a third slidewire connected between the contacts of said pair of slidewires and having a contact adjustable for selection of different speeds of the other of said control actions and effectively connected to one terminal of said detector, and a slidewire in shunt to said branches having a contact adjusted relative thereto in accordance with the magnitude of a process variable and effectively connected to the other terminal of said detector.

ELWOOD T. DAVIS.

REFERENCES CITED

The following references are of record in the file of this patent:

UNITED STATES PATENTS

| Number | Name | Date |
|---|---|---|
| 2,302,036 | Keeler | Nov. 17, 1942 |
| 2,325,232 | Davis | July 27, 1943 |
| 2,325,308 | Davis | July 27, 1943 |
| 2,395,515 | Stoller | Feb. 26, 1946 |
| 2,417,015 | Rozek | Mar. 4, 1947 |
| 2,457,165 | McNamee | Dec. 28, 1948 |
| 2,496,860 | Davis | Feb. 7, 1950 |